(No Model.)

A. J. SMART.
SCREW CUTTING DIE.

No. 306,783. Patented Oct. 21, 1884.

Attest:
F. W. Howard
Edw. H. Downs

Inventor:
Albert J. Smart
By C. S. Whitman
Atty.

United States Patent Office.

ALBERT J. SMART, OF GREENFIELD, MASS., ASSIGNOR TO THE WILEY & RUSSELL MANUFACTURING COMPANY, OF MASSACHUSETTS.

SCREW-CUTTING DIE.

SPECIFICATION forming part of Letters Patent No. 306,783, dated October 21, 1884.

Application filed August 8, 1883. (No model.)

*To all whom it may concern:*

Be it known that I, ALBERT J. SMART, a citizen of the United States, residing at Greenfield, in the county of Franklin and State of Massachusetts, have invented certain new and useful Improvements in Screw-Cutting Dies; and I do hereby declare the following to be a full, clear, and exact description of the invention, such as will enable others skilled in the art to which it appertains to make and use the same.

My invention relates to that class of dies which are made use of for cutting screw-threads; and the nature thereof consists in combining with dies having grooves cut in their exterior curved surfaces taper-headed screws interposed between the dies, and one or more set-screws, the ends of which work in the said dies.

Figure 1:
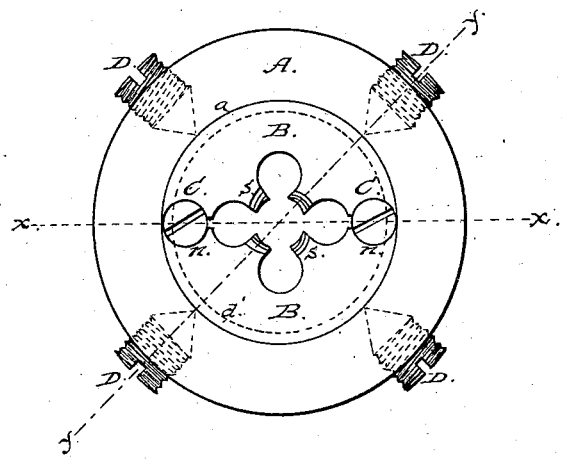
Figure 2:
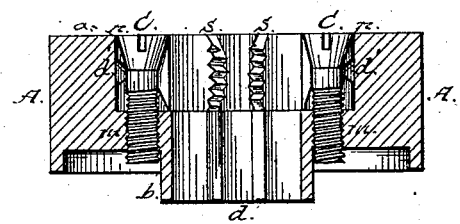
Figure 3:
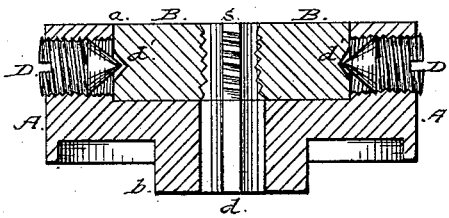
Figure 4:

In the accompanying drawings, Figure 1 is a plan view of the dies and the stock or holder in which they are placed. Fig. 2 is a transverse section taken on the line $x$ $x$ of Fig. 1. Fig. 3 is a transverse section on the line $y$ $y$ of Fig. 1. Fig. 4 represents one of the dies detached from the stock or holder.

The die stock or holder A is provided with a socket or receptacle, $a$, for the reception of the dies B B, and with a guide, $b$, cast solid therewith, in which is cut an aperture, $d$, which corresponds nearly in shape and size with the cutting-surface of the dies and permits of the passage of the screw. The external shape of the dies B B is such as to allow them to fit easily into the cavity or socket $a$, and they are provided with recesses $n$ $n$ on their opposite and adjacent faces, at the sides of the cutting portions $s$ $s$, for the reception of the screws C C, the heads of which have the form of conical frustums. The screws C C fit within the recesses $n$ $n$, of corresponding form, in the dies, and work in threaded screw-holes $m$ $m$, cut in the stock or holder. It is obvious, therefore, that when the screws C C are turned inward the tapering heads, working against corresponding tapering cavities in the outer parts of the recesses $n$ $n$, will force the dies apart, and that when the screws are turned outward a space will be left between the heads thereof and the dies, which will allow the latter to approach each other.

For the purpose of regulating the adjustment of the dies and rendering them capable of being held firmly in position when adjusted, grooves or channels $d'$ are formed or cut in the exterior curved surfaces of the dies, and one or more set-screws, D, are provided, which work in internal screws formed in the stock or holder. The end or ends of these set-screws, when turned in, project beyond the interior curved surface of the stock and enter the said groove or grooves, which may be in section rectangular, curved, angular, or of any desired shape or size.

The set-screws D are generally provided with conical points, so that when turned inward, in coming in contact with the edge of the said groove, they will not only force one of the dies toward the other, but will hold the die or dies firmly down against the bottom of the socket.

It is obvious that the ends of the set-screws may always be made to enter the groove in the die in whatever position the latter may be.

When it is desired to adjust the dies, the taper-headed screws C C are turned in or from the stock until the requisite distance between the dies is established. One or more of the set-screws D are then screwed up to secure the dies in the position at which they have been adjusted.

Having thus described my invention, I claim and desire to secure by Letters Patent of the United States—

The combination of the stock, the dies having grooves or channels $d'$ formed upon their exterior curved surfaces, and the set-screws D, working in internal screws in the stock, and provided with conical points, whereby the set-screws may always be made to enter the grooves in whatever position the latter may be, as herein described.

In testimony whereof I affix my signature in presence of two witnesses.

ALBERT J. SMART.

Witnesses:
CHAUNCEY BRYANT,
ANSON K. WARNER.